United States Patent [19]
Abrahamson et al.

[11] 3,909,895
[45] Oct. 7, 1975

[54] COATED LAMINATED CARBIDE CUTTING TOOL

[75] Inventors: Gerald R. Abrahamson, White Bear Lake; Charles E. Mereness, Arden Hills, both of Minn.

[73] Assignee: Minnesota Mining and Manufacturing Company, St. Paul, Minn.

[22] Filed: Mar. 13, 1974

[21] Appl. No.: 450,578

[52] U.S. Cl. ............... 29/95 A; 29/95 R; 76/101 A
[51] Int. Cl.² .................... B26D 1/00; B21K 21/00
[58] Field of Search ...... 29/95, 95 C, 95 A; 76/101, 76/101 A, 104, 104 A

[56] References Cited
UNITED STATES PATENTS

| | | | |
|---|---|---|---|
| 3,482,295 | 12/1969 | Trent | 29/95 R |
| 3,496,973 | 2/1970 | Ballard | 29/95 C |
| 3,564,683 | 2/1971 | Schedler | 29/95 R |
| 3,616,506 | 11/1971 | Ekemar | 29/95 R |
| 3,755,866 | 9/1973 | Ohlsson | 29/95 C |

*Primary Examiner*—Harrison L. Hinson
*Attorney, Agent, or Firm*—Alexander, Sell, Steldt & DeLaHunt

[57] ABSTRACT

A coated, laminated crater-resisting, composite, cemented carbide cutting tool insert. The cutting insert has a cemented metal carbide core comprising about 85 to 98 percent by weight metal carbide, the majority being tungsten carbide cemented together with an iron-group element binder, such as iron, nickel or cobalt. The core supports a crater resistant layer of cemented carbide containing tungsten carbide and at least one carbide of a metal contained in Groups IVb or Vb of the periodic table, and the rake face and flanks of the cutting insert are coated with a hard surface coating, e.g. titanium carbide the hard surface coating being about 0.0001 to 0.001 inch thick.

8 Claims, 2 Drawing Figures

U.S. Patent  Oct. 7, 1975  3,909,895

COATED LAMINATED CARBIDE CUTTING TOOL

BACKGROUND OF THE INVENTION

This invention relates to laminated carbide cutting tool inserts. In another aspect, it relates to coated carbide cutting tool inserts.

One example of a laminated carbide tool tip is disclosed in U.S. Pat. No. 3,482,295 issued to Trent where a cemented carbide core has a thin layer of a more crater-resistant cemented carbide disposed on the rake face. This thin layer contains a substantial portion of carbide formed from a metal of Group IVb or Vb of the periodic table. This construction was an improvement in the art but fails quickly under the high speed machining conditions common in today's machines. A primary mode of failure is high temperature plastic deformation of the cutting edge which is necessarily of a material composition which provides a compromise among deformation resistance, wear resistance and toughness.

Titanium carbide coatings for cutting inserts are known; U.S. Pat. No. 3,616,506 issued to Ekemar, et al., discloses a method for forming a titanium carbide coating of 2–6 microns on a cemented carbide core. These tools, though generally superior to laminated tools, also fail rapidly under today's high speed machining conditions. A method for producing hard surface coatings, e.g. metal carbides or nitrides, is disclosed in U.S. Pat. No. 2,884,894 issued to Ruppert et al.

SUMMARY OF THE INVENTION

The present invention is a coated laminated cutting insert which is highly resistant to premature failures under high speed machining conditions. The insert has a cemented metal carbide core containing a majority of tungsten carbide and possibly other metal carbides bonded with an iron group metal, e.g. cobalt, nickel or iron providing a tough, deformation resistant material which can withstand the stresses of machining. The core material has a thin layer of crater-resistant cemented carbide disposed on the rake face thereof, said crater-resistant layer containing tungsten carbide and substantial amounts of a carbide of a metal chosen from Groups IVb and Vb of the periodic table, the percentage of the Group IVb and Vb carbides is greater in the crater-resistant layer than in the core material. A thin coating of hard surface material coated on the composite substrate's rake face and flanks provides a coated, laminated structure which is resistant to cratering, flank wear and deformation even under high speed machining conditions.

BRIEF DESCRIPTION OF THE DRAWING

A further understanding may be had by referring to the accompanying drawing wherein like reference numerals refer to like parts and in which.

DESCRIPTION OF THE PREFERRED EMBODIMENTS

Figure 1:
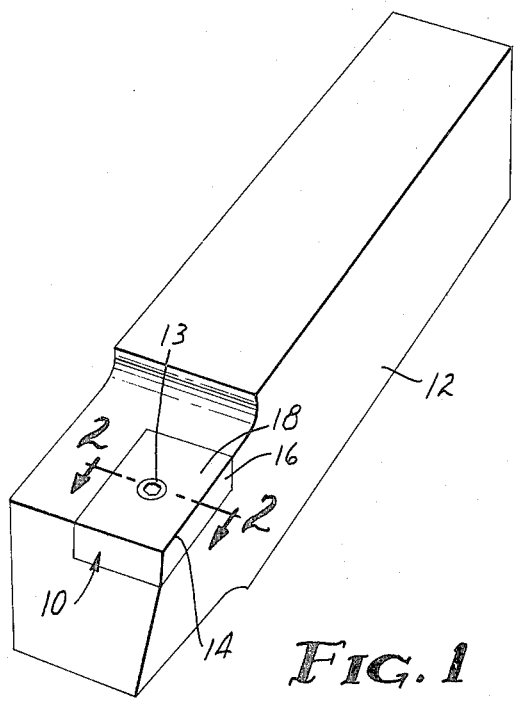
FIG. 1 is a perspective view of a cutting tool with an insert of this invention therein.

A coated, laminated carbide insert 10 of this invention is mounted securely in tool holder 12 (adapted to be placed in a machine such as a lathe) by screw 13 which mates with a complementary set of threads in the holder. When placed in a machine, the insert 10 presents cutting edge 14, at the intersection of a flank 16 and the rake face 18, to the work piece to be machined. During machining, the movement of chips cut from the work piece across the rake face 18 will form a crater on the rake face in the area behind the cutting edge; while abrasion of the work piece along flank 16 causes flank wear. Both types of wear contribute to failure of the tool and substantially shorten its useful cutting life.

Figure 2:
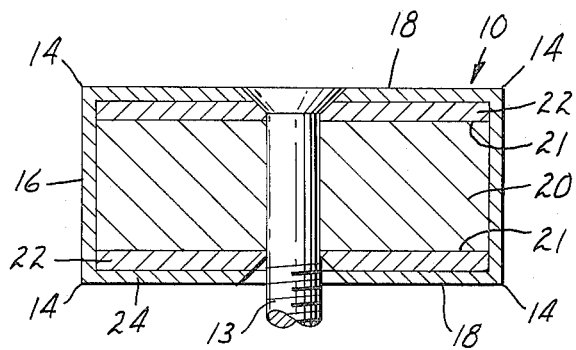
FIG. 2 is a cross-sectional view of FIG. 1 taken along line 2—2.

As shown in FIG. 2, both faces 18 of the insert can form usable rake faces, the insert being turned over when the cutting edges on the first face are worn. Such reversible inserts are known in the art and can have many geometric shapes, e.g. triangular, square, etc. A cemented metal carbide core 20 has two layers 22 of crater-resistant cemented carbide laminated on surfaces 21 of the core to form a laminated cemented carbide composite substrate. The composite substrate of core 20 and layer 22 has been further coated with a substantially pure titanium carbide coating 24 which is shown covering the entire composite substrate, but in all cases would cover at least the rake face and flanks.

The core material comprises a major portion of tungsten carbide and a minor portion of a binder metal chosen from the iron group consisting of iron, nickel and cobalt. In general, cobalt is the preferred binder because of its superior chemical compatibility and is the binder most often used by those skilled in the art. There may also be minor amounts of additive carbides of metals from Groups IVb and Vb of the periodic table, e.g. titanium, niobium, tantalum, zirconium, etc. present in the cemented carbide core. The chemistry of the core material can be adjusted by varying the relative proportions of tungsten carbide, binder and additive carbides to provide a balance of toughness (to withstand the shock of rough cutting operations), abrasion resistance, and deformation resistance.

The core can contain 85–98 percent by weight of tungsten carbide, 2–15 percent by weight binder and up to 13 percent by weight of carbides of metals from Groups IVb and Vb. In general, the core is toughest when it comprises only tungsten carbide and cobalt, the preferred composition, e.g. about 91 percent WC and 9 percent Co.

The crater-resistant layer 22 disposed on the core material is a cemented carbide comprising tungsten carbide, a binder (the binder being chosen from the iron group) and one or more additive carbides formed from the metals of Groups IVb and Vb of the periodic table. The additive metal carbides produce a material resistant to the formation of craters as the chips move over the rake face and will be present in from about 2 to 34 percent by weight, preferably 10 to 25 percent by weight. The most preferred additive metal carbides are TiC, the most crater resistant, and TaC which provides strength and good high temperature machining properties, although other carbides can be present depending on the specific properties desired. A specific example of the crater-resistant layer is a layer formed from composition comprising about 75 percent WC, 8 percent TiC, 12 percent TaC, and 8 percent Co.

The core with its crater resistant layer disposed on the rake face or faces can be formed in various ways. One method is compacting a mixture of powders having the desired composition of the green core and then placing a layer of a second mixture of powder having the desired proportions for the green crater-resistant layer on top of the green core and compacting both mixtures followed by sintering the resulting green compacted laminate using standard techniques to form a finished cemented carbide material. As an alternative, previously formed, green unsintered layers of carbide materials having the desired proportions for the various layers could be laminated and compacted together followed by sintering as above to form a laminated cemented metal carbide composite substrate. Modifications and alternative methods for forming cemented carbide tools are well known in the art. Additional methods of forming the sintered material are found in U.S. Pat. No. 2,121,488 issued June, 1921 to Ritzau, the disclosure pertaining to making laminates being incorporated herein by reference.

At least the rake face and flanks of the laminated carbide composite substrate of this invention are coated with a hard surface coating having a thickness no greater than about 0.0254 mm and preferably about 0.00254 to 0.0254 mm. Although thin, the hard surface coating materially increases both the crater and flank wear resistance of the laminated insert when compared with prior art laminated inserts. Acceptable hard coatings are composed of carbides, nitrides, borides and silicides of at least one of the metals of Groups IV$b$ and V$b$ of the periodic table as well as mixtures of the foregoing hard coatings. Examples of suitable hard surface coatings include titanium carbide, titanium nitride, titanium carbonitride, titanium boride, tantalum carbide and tantalum nitride. The preferred hard surface coatings are the carbides and nitrides because of their commercial acceptance. Among the carbides and nitrides, titanium carbide is the most preferred carbide.

Pure titanium carbide has excellent crater resistance but only limited strength; however, the laminated composite substrate under the titanium carbide coating supports and supplements the titanium carbide coating extending the useful life of the insert even after the titanium carbide coating has been abraded away. It is also thought in the art that the TiC coating reduces machining temperatures because of its low frictional coefficient even though it is a very thin coating and provides protection from heat buildup in the laminated composite substrate during cutting operations. A further hard surface coating is aluminum oxide which when coated over the composite substrate produces an insert combining the toughness of the carbide with the wear resistance and low reactivity of aluminum oxide.

A further understanding may be had by referring to the following nonlimiting example in which all parts and percentages are by weight unless otherwise noted.

EXAMPLE 1

Carbide cutting inserts of four general types were formed:

1. A sintered tungsten carbide core material with and without additional metal carbides;
2. a laminated structure comprising a core material having a crater-resistant layer on the rake face;
3. a laminated structure like 2 with a chemical vapor deposited coating of titanium carbide;
4 a core material like 1 having a vapor deposited titanium coating.

A mixture of powdered tungsten carbide are cobalt powder having 0.5–3 micron diameters was extensively ball milled to thoroughly mix the powders, reduced at 700°C. in $H_2$ and about 2 percent by weight of paraffin added as a lubricant, and the resulting mixture was placed in a steel die and lightly compacted under a pressure of 4 t.s.i. to form a smooth surface core about 0.11 inch thick.

A mixture of tungsten carbide, additive carbide and cobalt powders was ball milled and two layers of about 0.060 inch thick placed one on each face of the smooth surfaced lightly compacted core and the resulting core and loose powder layers compacted at 15 t.s.i. to form a laminate.

The compacted laminate was heated in $H_2$ to 350°C. for about 1 hr. to remove the paraffin present forming a porous compacted material having about 60 percent theoretical density. The porous compact was then sintered in vacuum to 1,200°C. and as the temperature was raised to 1,550°C. the system is pressurized to 500 microns with argon to prevent the vaporization of cobalt from the compact and the compact sintered at 1,550°C. for 45 mins. to form a composite substrate which is essentially fully dense.

The composite substrate is were diamond ground to a square configuration being about ⅛ inch thick, the crater resistant material on the rake face being 0.015 inch thick on the dressed tool. The cutting edges had a radius of 0.001–0.002 inch on the finished laminated composite substrate.

For the coated tools a thin coating of substantially pure TiC was chemically vapor deposited on the composite substrate to a thickness of about 0.0002–0.0003 inches.

The specimens were tested for cratering and flank wear by mounting the inserts in a tool holder and then in a metal lathe. The inserts were used to cut an AISI 4142 alloy steel tube, having a Rockwell C hardness of 35. The cutting was done at about 650 SFPM, taking a 0.062 inch deep cut at 0.010 IPR (inch per revolution) feed. The tool life was defined as complete when the tool showed 0.020 inch flank wear.

Core, and crater resistant layer compositions and the test results are tabulated in Table 1.

TABLE I

| EXAMPLE | CORE | LAMINA | CUTTING EDGE | COATING | TRIALS | TIME TO END POINT | |
|---|---|---|---|---|---|---|---|
| | | | | | | AVE. | MAX. |
| 1 | A | None | A | None | — | 1 | 1 |
| 2 | B | None | B | None | — | 1 | 6 |
| 3 | A | B | B | None | 4 | 14 | 19 |
| 4 | A | None | A | TiC | 6 | 14 | 21 |
| 5 | B | None | B | TiC | 4 | 17 | 17 |
| 6 | A | B | B | TiC | 8 | 35 | 50+ |

A- 94% WC and 6% Co.
B- 72% WC, 8% TiC, 12% TaC, and 8% Co.

The present results show that the coated laminate of this invention, Example 6, substantially out performs laminate materials, Example 3 or coated materials, Examples 4 and 5. In fact the average tool life of Example 6 is greater than the sum of the tool life of Examples 3 and 5 which are the components of Example 6. As shown the maximum life obtainable from the tool of this invention strikingly exceeds the maximum life obtainable from the separate components. Thus, the coated laminate of this invention unexpectedly produces a product which performs better than the sum of its components providing a new useful cutting tool.

What is claimed is:

1. A laminated, crater-resisting carbide cutting tool insert comprising:
   a laminated cemented carbide composite substrate having a cemented metal carbide core containing a majority of tungsten carbide bound with an iron group binder and a thin layer of crater-resistant cemented metal carbide differing in chemical composition from the core on the rake face of said substrate and forming the cutting edge of the substrate, said crater-resistant material comprising a major portion of tungsten carbide and at least one additional carbide of a metal chosen from Groups IV$b$ and V$b$ of the periodic table, and
   a hard surface coating surfacing the rake face and flanks of said substrate, said hard surface coating being no more than 0.0254 millimeter in thickness.

2. The cutting tool insert of claim 1 wherein said core contains a minor amount of an additional carbide of a metal of Group IV$b$ or V$b$ of the periodic table, the amount of said additional carbide being less than the amount of the same carbide in the crater-resistant layer and tending to decrease the migration of cobalt from said crater-resistant layer to said core.

3. The cutting tool insert of claim 1 wherein said core has a composition comprising about 85 to 98 percent by weight tungsten carbide and about 2 to 15 percent by weight cobalt binder.

4. The cutting tool insert of claim 1 wherein said core comprises about 91 percent WC and 9 percent Co.

5. The cutting tool insert of claim 1 wherein said crater-resistant layer is formed from a composition comprising about 72 percent WC, 8 percent TiC, 12 percent TaC and 8 percent Co.

6. The cutting tool insert of claim 1 wherein said hard surface coating is a metal-nitride formed from at least one of the metals of Groups IV$b$ and V$b$ of the periodic table.

7. The cutting tool insert of claim 1 wherein said hard surface coating is titanium carbide.

8. The cutting tool insert of claim 1 wherein said hard surface coating is a metal-carbide formed from at least one of the metals of Group IV$b$ and V$b$ of the periodic table.

* * * * *